United States Patent Office 3,647,848
Patented Mar. 7, 1972

3,647,848
BIURET DIISOCYANATES
Kuno Wagner, Leverkusen, and Gerhard Mennicken, Opladen, Germany, assignors to Farbenfabriken Bayer Aktiengesellschaft, Leverkusen, Germany
No Drawing. Filed Sept. 16, 1968, Ser. No. 760,085
Claims priority, application Germany, Sept. 18, 1967, P 17 20 711.3
Int. Cl. C07c 119/04; C08g 22/24, 22/44
U.S. Cl. 260—453 AB                                    1 Claim

ABSTRACT OF THE DISCLOSURE

Stabilized polyurethanes prepared by reacting polyisocyanates with compounds containing at least two reactive hydrogen atoms as determinable by the Zerewitinoff method wherein the polyisocyanate reactant is an aliphatic, cycloaliphatic or araliphatic polyisocyanate or an isocyanurate of an aliphatic, cycloaliphatic or araliphatic polyisocyanate with aromatic polyisocyanates, which polyisocyanate reactant contains an asymmetric dialkyl substituted semicarbazide, carbazic ester or carboxylic acid hydrazide group and at least one biuret, urethane, acylated urea or acylated isocyanurate group in the molecule.

---

This invention relates to polyurethanes stabilized against discoloration at elevated temperatures and to a unique stabilizing agent.

It is already known that aliphatic, cycloaliphatic or araliphatic polyisocyanates may be reacted with polyesters which contain hydroxyl groups to form light-resistant polyurethane resins, in particular for use in lacquer coatings which have maximum fastness to light and which have the highly permanent gloss, excellent resistance to chalking when exposed to weathering, and good resistance to water, chemicals and solvents required of lacquer coatings.

However, all the polyurethane resins known at the present time, including those used for lacquers and other coatings based on polyhydroxyl compounds and light resistant aliphatic, cycloaliphatic or araliphatic polyisocyanates are liable to undergo discoloration at temperatures above about 120° C., even in the absence of air or oxygen. This deleterious feature of otherwise high quality light-resistant polyurethane lacquers limits their use, e.g. for finishing high quality specialized articles such as steam radiators, supersonic aircraft or special technical parts required in the construction of machines that are permanently exposed to elevated temperatures.

It is therefore an object of this invention to provide new polyisocyanates which contain an asymmetric dialkyl substituted semicarbazide, carbazic acid ester or carboxylic acid hydrazide group and at least one biuret, urethane, acylated urea or acylated isocyanurate group in the molecule.

It is also an object of this invention to provide polyurethanes in general and polyurethane lacquers in particular, and a process for preparing them which are devoid of the foregoing disadvantages.

Another object of this invention is to provide a unique stabilizing agent for polyurethane foams, coatings, lacquers and adhesives.

Still another object of this invention is to provide polyurethanes which do not discolor at elevated temperatures and which are light stable, weather resistant and resistant to water, chemicals and solvents.

Yet another object of this invention is to provide a process for preparing a stable polyurethane with a unique stabilizing material which is also one of the reactants from which the polyurethane is formed.

The foregoing objects and others which will become apparent from the following description are accomplished in accordance with this invention, generally speaking, by providing polyurethanes prepared by reacting polyisocyanates with compounds containing at least two reactive hydrogen atoms as determined by the Zerewitinoff method wherein the polyisocyanate reactant is an aliphatic, cycloaliphatic or araliphatic polyisocyanate or an isocyanurate of an aliphatic, cycloaliphatic or araliphatic polyisocyanate with an aromatic polyisocyanate, which polyisocyanate reactants contain an asymmetric dialkyl substituted semicarbazide, carbazic ester or carboxylic acid hydrazide group and at least one biuret, urethane, acylated urea or acylated isocyanurate group in the molecule.

The polyisocyanates of this invention render the polyurethanes prepared therefrom resistant to discoloration at elevated temperatures, light resistant, weather resistant and resistant to chemicals, water and solvents. Further, polyurethane foams, coatings, lacquers and adhesives having excellent properties can be prepared from the polyisocyanates of this invention and, in particular, especially useful adhesives for bonding multi-layered reinforced glass can be thus prepared.

The new polyisocyanates of this invention may be used as starting materials in the production of polyurethane resins such as foams, coatings or lacquer films which are light-resistant and possess increased stability against discoloration on application of heat. They may also be used in admixture with known polyisocyanates, especially light-resistant isocyanates such as N,N',N"-tris-(isocyanatohexyl)-biuret or adducts of 3 mols of aliphatic, cycloaliphatic or araliphatic diisocyanates with 1 mol of trimethylolpropane or the like as long as from about 5 to about 50% and preferably 15 to 30% of the polyisocyanate mixture is made up of the stabilizing polyisocyanate of this invention. In either event, the stabilizing isocyanates of this invention substantially improve the fastness to light and the stability against discoloration on application of heat to polyurethane products in general and polyurethane coatings and lacquers in particular.

It has already been disclosed in German Pats. Nos. 1,184,947 and 1,184,948 that semicarbazides or carbazic esters or carboxylic acid hydrazides may be used as additives which stabilize polyurethane resins against discoloration and oxidation. In those cases, however, polyurethane resins which contain the chain lengthening and chain branching groups

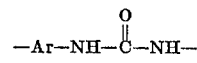

and/or

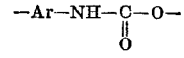

(Ar=aromatic radical.)

are stabilized with additives, that is to say polyurethane resins which are built up from aromatic polyisocyanates which are not light-resistant are stabilized by the presence

TABLE 1.—POLYISOCYANATES CONTAINING SEMICARBAZIDE GROUPS

| No. | Idealized formula | Preparation analogous to— | Properties |
|---|---|---|---|
| 1 | 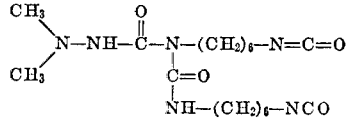<br>Resp. isomer<br>(A) | DBP* 1,215,365, column 3, lines 40-45 and DBP 1,101,394, page 2, column 3 lines 25-40. | Calculated, percent NCO 21.3.<br>Found, 20.5, colorless to yellowish oil.<br>Melt viscosity, 500 cp./30°C. |
| 2 | 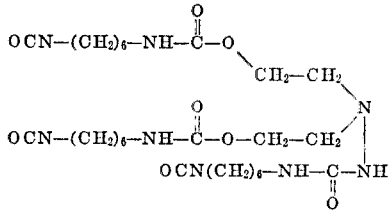<br>(B) | ......do............... | Calculated, percent NCO 20.2.<br>Found, 19.6, colorless to yellowish oil.<br>Melt viscosity, 2,500 cp./30° C. |
| 3 | 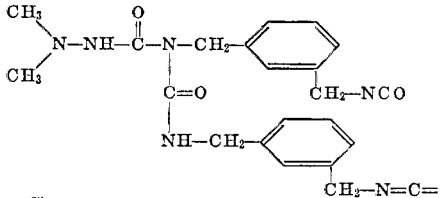<br>(C) | ......do............... | Calculated, percent NCO 19.3.<br>Found, 18.9, moderately highly viscous, readily soluble resin.<br>Melt viscosity, 4,888 cp./75° C. |
| 4 | 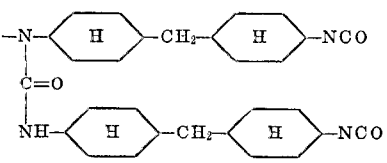<br>(D) | ...do............... | Calculated, percent NCO 14.4.<br>Found, percent NCO 15.1, moderately high viscous, colorless, resin, readily soluble.<br>Melt viscosity, 5,888 cp./75° C. |
| 5 | 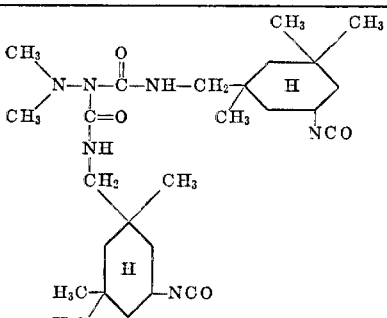<br>(E) | ......do............... | Calculated, percent NCO 16.6.<br>Found, percent NCO 16.2, colorless, medium viscosity oil.<br>Melt viscosity, 1,800 cp./30° C. |
| 6 | 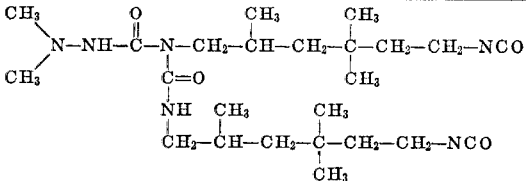<br>(F) | ......do............... | Calculated, percent NCO 17.5.<br>Found, percent NCO 16.8, colorless, low viscosity oil.<br>Melt viscosity, 980 cp./30° C. |
| 7 | 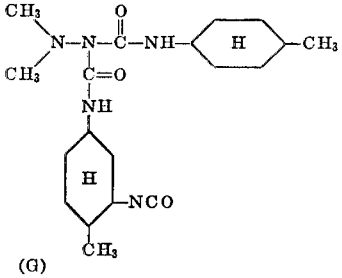<br>(G) | ......do............... | Calculated, percent NCO 20.0.<br>Found, 19.3, medium viscosity colorless oil.<br>Melt viscosity, 1,500 cp./30° C. |

*Deutches Bundesrepublik Patentschrift.

of additives which do not take part in the actual structure of the polyurethane molecule. The stabilizers according to these German patent specifications are therefore always added to the OH/NCO-containing starting materials after preparation of the polyurethane or after the molecular weight has already increased to a considerable extent in order that chain lengthening may not be disturbed or prevented by chain breaking reactions involving the stabilizing additive. The polyisocyanates of the present invention, however, are used in the actual synthesis of the product and are involved ab initio in the synthesis of the high molecular weight polyurethane resins to advantageously modify their properties accordingly. Hence, the polyisocyanates of this invention are actual reaction components in the production of polyurethane resins.

The present invention accordingly provides a process for the production of polyurethane resins from polyisocyanates and compounds with reactive hydrogen atoms, preferably polyhydroxyl compounds and, if desired, chain lengthening agents, which is characterized in that the polyisocyanates used are aliphatic, cycloaliphatic or araliphatic polyisocyanates or isocyanurate-containing copolymers of such polyisocyanates with aromatic polyisocyanates, which contain a hydrazine derivative which is an asymmetric dialkyl-substituted semicarbazide, carbazic ester or carboxylic acid hydrazide group and at least one biuret, urethane, acylated urea or acylated isocyanurate group, if desired in the form of a 5 to 50%, preferably 15 to 30% mixture with aliphatic, cycloaliphatic, araliphatic or aromatic polyisocyanates, preferably with light resistant aliphatic, cycloaliphatic or araliphatic polyisocyanates. The alkyl radical of the asymmetric dialkyl substituted semicarbazide, carbazic ester or carboxylic acid hydrazide group can be the same or different and contain 1 to 18 carbon atoms. The copolymers of the aliphatic, cycloaliphatic or araliphatic polyisocyanates with aromatic polyisocyanates containing isocyanurate rings have a content of aromatic residues generally up to 60% and these copolymers generally have 1 to 2 isocyanurate groupings. The new polyisocyanates which are also used for the production of polyurethane resins contain as already indicated an asymmetric dialkyl substituted semicarbazide, carbazic ester or carboxylic acid hydrazide group and at least one biuret, urethane, acylated urea or acylated isocyanurate group. Of course, several different of these groups can be present, generally not more than 5 of each such group or of several different ones are contained in the new polyisocyanate. The invention also provides polyurethane resins which are obtained by this process.

The polyisocyanates described in Tables 1 to 4 which follow are examples of polyisocyanates which may be used in the process of this invention. These compounds are N,N-dimethyl or N,N-bis-hydroxy substituted derivatives. However, polyisocyanates which have other substituents, e.g. ethyl, propyl, butyl or hexyl radicals in the N,N-position of the hydrazine component may also be prepared by the methods indicated in Tables 1 to 4 and subsequently, and may be used with equal advantage in the process of this invention.

TABLE 2.—BIURET-CONTAINING POLYISOCYANATES WHICH HAVE ONE SEMICARBAZIDE GROUP

| No. | Idealized formula | Preparation analogous to— | Properties |
|---|---|---|---|
| 1 | (H) OCN—(CH₂)₆—N—C—NH—(CH₂)₆—NH—C—NH—N(CH₃)₂ ; C=O ; OCN—(CH₂)₆—NH | DBP 1,215,365, column 3, lines 40–45 and DBP 1,101,394, page 2, column 3, lines 25–40. | Calculated, percent NCO 15.6. Found, 14.9, medium viscosity colorless yellow oil. Melt viscosity, 1,200 cp./30° C. |
| 2 | (I) structure with two OCN-phenyl-CH₂- groups connected to N—C—NH-phenyl-N(CH₃)₂ with C=O bridge and NH | ...do... | Calculated, percent NCO 10.2. Found, 9.2, viscous resin. Melt viscosity, 3,500 cp./75° C. |
| 3 | (J) structure with H₃C-phenyl-N—C—NH and H₃C-phenyl-NCO with C=O bridge to NH—C—NH—N(CH₃)₂ | ...do... | Calculated, percent NCO 14.5. Found, 13.5, viscous colorless resin. Melt viscosity, 4,050 cp./75° C. |

TABLE 3.—URETHANE-CONTAINING POLYISOCYANATES WITH ONE SEMICARBAZIDE GROUP

| No. | Idealized formula | Preparation analogous to— | Properties |
|---|---|---|---|
| 1 | 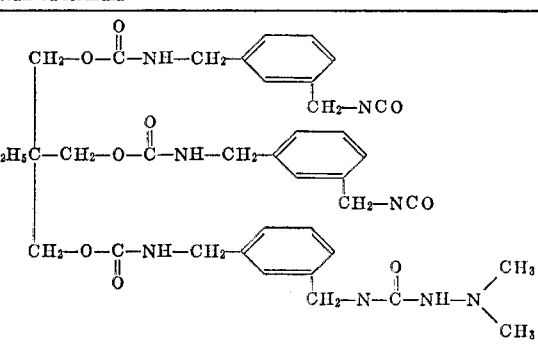 (K) | DBP 1,215,365 column 3, lines 40-45 and DBP 1,101,394, page 2, column 3, lines 25-40. | Calculated, percent NCO 11.2. Found, 9.9, colorless viscous resin. Melt viscosity, 5,000 cp./75° C. |
| 2 | 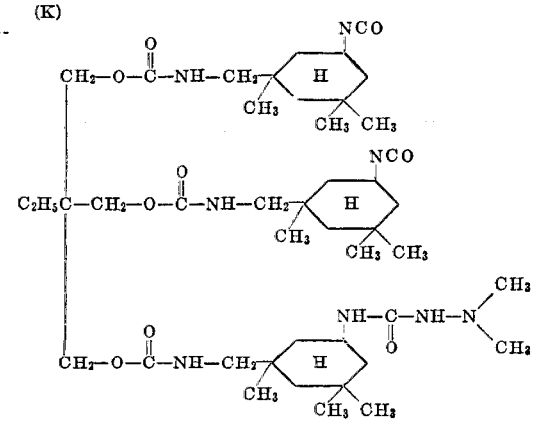 (L) | ......do............ | Calculated, percent NCO 9.8. Found, 9.1, colorless viscous resin. Melt viscosity, 3,900 cp./75° C. |
| 3 | 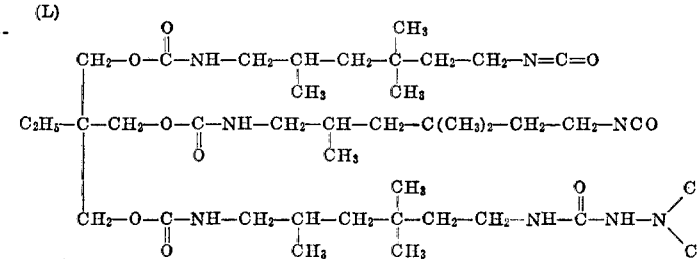 (M) | ......do............ | Calculated, percent NCO 10.2. Found, 9.2, colorless viscous oil. Melt viscosity, 820 cp./30° C. |

TABLE 4.—CARBAZIC ESTER POLYISOCYANATES CONTAINING URETHANE AND BIURET GROUPS, POLYISOCYANATES CONTAINING URETHANE AND HYDRAZIDE GROUPS, AND POLYISOCYANATES CONTAINING HYDRAZIDE GROUPS AND ACYLATED UREA GROUPS

| No. | Idealized formula | Preparation analogous to— | Properties |
|---|---|---|---|
| 1 | 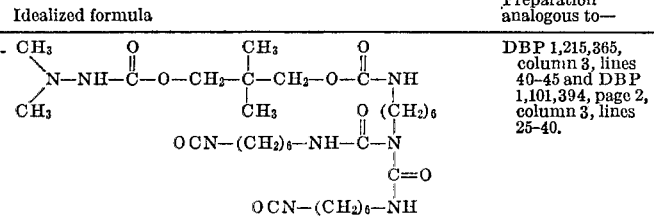 (N) | DBP 1,215,365, column 3, lines 40-45 and DBP 1,101,394, page 2, column 3, lines 25-40. | Calculated, percent NCO 12.6. Found, 11.5, colorless resin. Melt viscosity, 4,000 cp./30° C. |
| 2 | 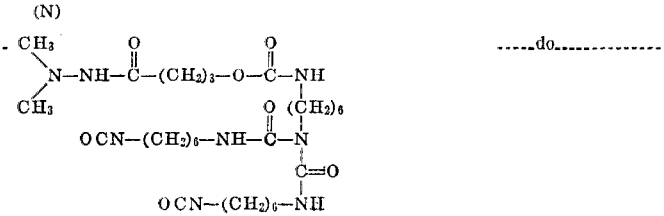 (O) | ......do............ | Calculated, percent NCO 13.6. Found, 12.1, colorless resin. Melt viscosity: 3,500 cp./30° C. |

TABLE 4—Continued

| No. | Idealized formula | Preparation analogous to— | Properties |
|---|---|---|---|
| 3 | (P) 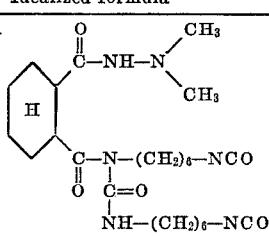 | DBP 1,230,778, page 2, column 3, lines 10–15. | Calculated, percent NCO 16.6. Found, 14.6, readily soluble viscous resin. Melt viscosity, 3,700 cp./75° C. |
| 4 | (Q) 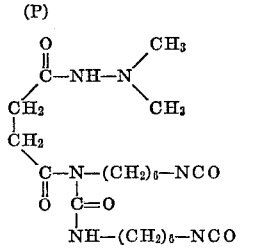 | ......do............... | Calculated, percent NCO 18.6. Found, 16.7, readily soluble viscous colorless resin. Melt viscosity, 3,500 cp./300° C. |
| 5 | (R) 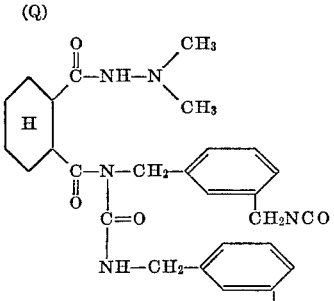 | ......do............... | Calculated, percent NCO 15.5. Found, 13.5, readily soluble colorless viscous resin. Melt viscosity, 4,100 cp./75° C. |

The new polyisocyanates described in Tables 1 to 4 can be prepared in a manner analogous to the procedures described in German patent specifications Nos. 1,215,365; 1,101,394; 1,230,778 and the like. In these procedures, 1,1-disubstituted hydrazine derivative, for example, are reacted with a large excess of polyisocyanate, preferably a light-resistant aliphatic, cycloaliphatic or araliphatic polyisocyanate or isocyanurate containing copolymer of such polyisocyanates with aromatic polyisocyanates. The content of aromatic polyisocyanates shall not exceed 60% by weight. After the reaction, the excess monomeric polyisocyanate is removed if desired by any suitable method such as, for example, by thin layer evaporation or by extraction with a solvent such as ligroin, cyclohexane and the like.

The following compounds are examples of 1,1-disubstituted hydrazines which may be used in the preparation of such polyisocyanates: N,N-dimethylhydrazine, N,N-bis-(β-hydroxy-ethyl)-hydrazine, N,N-diethylhydrazine, N,N-dipropylhydrazine, N,N-distearylhydrazine, N-methyl-N-ethylhydrazine, N,N-diisopropylhydrazine, N-methyl-N-benzylhydrazine, N-amino-piperidine, N-amino-morpholine, N-amino-N'-methylpiperazine N,N'-diaminopiperazine, 4-amino-1,2,4-triazole. These hydrazine derivatives may also be used in the synthesis of compounds of the dialkylcarbazic ester type which can be converted into polyisocyanates. In such a case, the above-mentioned hydrazines are converted into hydroxyl-containing carbazic ester alcohols by reaction with cyclic carbonates such as the carbonate of 2,2-dimethyl-propanediol-(1,3), and these alcohols are in turn reacted with a large excess of polyisocyanate by the process described in the above-mentioned German patent specifications. The reaction products are then isolated in the manner described. The 1,1-disubstituted hydrazines given by way of example may also be converted into hydroxyl-containing carboxylic acid hydrazide derivatives, for example by reaction with butyrolactone, and these carboxylic acid hydrazide derivatives may be converted into the polyisocyanates to be used in the practice of this invention by reaction with other polyisocyanates, for example by the procedure described. In addition, cyclic carboxylic acid anhydrides such as hexahydrophthalic acid anhydride can be reacted with the hydrazines to form carboxylic acid hydrazides, the free carboxyl groups of which are then reacted by the procedure described in German patent specification No. 1,230,-778 to for urea polyisocyanates which contain acyl groups.

Polyisocyanates which may be used for these reactions with N,N-dialkylsubstituted hydrazines, carbazic acid ester hydrazides or carboxylic acid hydrazides may be of any type. However, light resistant aliphatic, cycloaliphatic or araliphatic polyisocyanates or isocyanurate containing copolymers of these polyisocyanates with aromatic polyisocyanates are preferably used. Some such suitable aliphatic, cycloaliphatic or araliphatic polyisocyanates which may be used and from which isocyanurate copolymers may be prepared include, for example, those listed in Canadian Pat. 698,636 such as, for example, 1,4-tetramethylene diisocyanate,
1,5-pentamethylene diisocyanate,
1,6-hexamethylene diisocyanate,
2,4,4-trimethyl-1,6-diisocyanato-hexane,
1,12-dodecamethylene diisocyanate,
1,2-diisocyanatocyclobutane,
dicyclohexyl-4,4'-diisocyanate,
dicyclohexylmethane-4,4'-diisocyanate,
p- and m-xylylene diisocyanate,
1-methyl-2,4-diisocyanatocyclohexane,
isophorone-diisocyanate and the like; triisocyanates such as biuret triisocyanates which can be prepared from diisocyanates such as those included above by the procedure described in German Pat. 1,101,394, for example, and the like; adducts of diisocyanates such as those mentioned above with low molecular weight, trifunctional polyols such as, for example, addition products of 3 mols of the diisocyanate with 1 mol of trimethylolpropane, glycerol, aminoethanol, diethanolamine, triethanolamine, 3-aminopropanol-(1), N-cyclohexyl-trimethylene diamine and the like or the addition products of 2 mols of the diisocyanate with 1 mol of N-methyl-diethanolamine, N - methyl - dipropanolamine, 2-methyl-aminoethanol, 3-ethoxy-propylamine, cyclohexylamine, 2 - hydroxyethyl - cyclohexylamine, 1-cyclohexylamino-propanol-(2) and the like. Polymers and copolymers of diisocyanates such as those included above with aromatic diisocyanates such as, for example, those polymers and copolymers which contain about 40% of 1,6-hexamethylene diisocyanate and about 60% of 1-methylbenzene-2,4-diisocyanate or, in other words, polyisocyanates which may contain several isocyanurate rings, may also be used. Further copolymers with other aromatic polyisocyanates such as are disclosed in Canadian Pat. 698,636 may also be employed. Polyisocyanates obtained by reacting a large excess of triisocyanates such as those mentioned above and listed in the Canadian patent with 1,1-dialkyl-substituted hydrazines, carbazic esters and carboxylic acid hydrazides are preferably used in the process of this invention. In such cases, the hydrazine derivatives are also reacted with a large excess of triisocyanates in a process which is analogous to that described in the aforementioned German Patents. This excess may even amount to an 8 to 10-fold molar excess of triisocyanates in some cases.

When triisocyanates are reacted with the above mentioned hydrazine derivatives, the resulting polyisocyanates need not always be isolated and the new polyisocyanates may be used for the production of thermostable polyurethane resins in the form of mixtures in concentrations of 5 to 50%, preferably 15 to 30%, with other polyisocyanates such as, for example, N,N',N''-tris-(isocyanatohexyl)-biuret, the adducts of 3 mols of aliphatic, cycloaliphatic or araliphatic diisocyanates with 1 mole of trimethylolpropane and the like and isocyanaurate-containing copolymers of aliphatic and aromatic polyisocyanates and the like. The novel polyisocyanates described in Tables 1 to 4, for example, may either be used alone as the polyisocyanate component in the production of the stable polyurethane products of this invention or else, since they are highly effective stabilizing agents, they may also be used in admixture with known polyisocyanates, preferably light-resistant polyisocyanates, wherein from about 5 to 50% and preferably 15 to 30% of the admixture is composed of the stabilizing polyisocyanates of this invention. The described mixtures are easy to prepare since the new polyisocyanates are highly soluble in the light-resistant triisocyanates having biuret structures used, for example, in the lacquer industry, including N,N',N''-tris-(isocyanatohexyl)-biuret, in the adducts of 3 mols of aliphatic, cycloaliphatic or araliphatic diisocyanates with 1 mol of trimethylolpropane. An isocyanurate-containing aliphatic, cycloaliphatic or araliphatic polyisocyanates or their copolymerization products with aromatic polyisocyanates and the like.

Polyisocyanates analogous to the new polyisocyanates described in Tables 1 to 4 may also be prepared from aromatic polyisocyanates such as 1-methylbenzene-2,4-diisocyanate and its isomers, 4,4'-diisocyanato-diphenyl-methane and its isomers, and the like and used in the production of polyurethane resins. They also stabilize the resins against discoloration on heating, but they are less satisfactory than the light-resistant polyisocyanates of this invention.

In order to prepare the polyurethane products of this invention, the described stabilizing polyisocyanates are reacted with compounds with reactive hydrogen atoms, preferably polyhydroxyl compounds and, if desired, with chain lengthening agents. If a foam is to be produced, water and/or any other suitable blowing agent is also included in the reaction mixture. Reaction accelerators such as, for example, dimethylbenzylamine, hexahydrodimethylaniline, N,N'-dimethylpiperazine, N,N'-endoethylenepiperazine, dibutyl tin dilaurate, stannous salts of 2-ethyl-caproic acid, zinc naphthenate, and zinc oleate and the like may also be added.

In the production of light fast lacquers, coatings or bonding agents, especially those used in the production of multilayer glass, the polyisocyanates of this invention, when used either alone or at concentrations of approximately 5 to 50% and preferably 15 to 30% in admixture with known polyisocyanates, are mixed with the polyhydroxyl compounds in the presence of the usual solvents and auxiliary agents used in the lacquer and adhesive industry, and are then applied to the required articles, for example by painting, spraying, casting or wiping. Hardening is carried out either at room temperature or at elevated temperatures during or after evaporation of the solvent. Although the proportion of polyisocyanates and polyhydroxyl compounds used depends mainly on the hydroxyl number of the polyhydroxyl compound, it is not necessary to use equivalent quantities. Therefore, one may use an excess of isocyanate groups such as for example of about 40 mol percent of isocyanate groups or more or one may even work with isocyanate groups present in less than the equivalent amount such as, for example, by about 40 mol percent, if desired in the presence of any suitable reaction accelerators such as those of the type mentioned above, for example.

Any suitable compound having at least two reactive hydrogen atoms as determinable by the Zerewitinoff method can be used according to the invention in the reaction with the new polyisocyanates. These compounds are known in the art and are, for instance, polyethers, polyesters, polyester amides, polyacetals, polythioethers having preferably a molecular weight from 500 to 10,000 and having OH— and/or NSR— ($R=C_1-C_{18}$-alkyl) and/or SH-groups. Polyhydroxyl compounds are preferred.

The polyhydroxyl compounds which are reacted with the new polyisocyanates generally have an OH number of between 50 and 400, and preferably between 120 and 300. Preferred compounds, especially for use in the field of lacquers, include condensation products of trimethylolpropane, hexane triol-(1,2,6) and/or butanediol-(1,4) or 2,2-dimethyl-propanediol-(1,3) with phthalic acid and/or isophthalic acid and, if desired, hexahydrophthalic acid. In addition, the polyethers, polyester amides, polyacetals and polythioethers customarily used in polyurethane chemistry may be employed such as, for example, those described in U.S. Pat. 3,201,372. Suitable chain lengthening agents include, glycols, such as butanediol-(1,4) or amines such as 4,4'-diphenylmethane diamine as well as those listed in U.S. Pat. 3,201,372.

If desired, dyes, pigments, fillers and levelling agents may be added to the lacquer solutions.

By the process of this invention lacquer coatings, for example, which have excellent properties can easily be produced. Such coatings not only remain practically unchanged in sunlight or in artificial light such as that used, for example, in the xenon test apparatus or in the Fadeometer, but also undergo much less discoloration than light-resistant polyurethane lacquers hitherto used when continuously exposed to temperatures above 120° C. for long periods of time.

The invention is further illustrated by the following examples in which the parts are by weight unless otherwise indicated.

EXAMPLE 1

About 50 parts of a polyester prepared from about 3 mols of phthalic acid and about 4 mols of trimethylolpropane and having an hydroxyl content of about 10.1% are worked up into a paste with about 50 parts of a solvent mixture of equal parts of toluene, ethyl acetate, butyl acetate, and b-methoxyethyl acetate, and about 53 parts of titanium dioxide (rutile type). A further about 90 parts of the solvent mixture and about 1 part of a polyvinyl ethyl ether as levelling agent are added to this paste (Mixture I).

75% solutions in ethyl acetate of the polyisocyanates described in Table 4 are then added to mixture (I) in the following quantities.

To every 244 parts of mixture (I) are added:

75 parts of polyisocyanate A
77 parts of polyisocyanate B
76 parts of polyisocyanate C
80 parts of polyisocyanate D To every 244 parts of mixture (I) are added:

83 parts of polyisocyanate E
78 parts of polyisocyanate F
79 parts of polyisocyanate G
80 parts of polyisocyanate H
130 parts of polyisocyanate L
90 parts of polyisocyanate N
85 parts of polyisocyanate O
75 parts of polyisocyanate P
40 parts of hexamethylene-1,6-diisocyanate (lacquer to be used for comparison)

After the lacquer mixtures are applied to wood, metal or glass, dry, light-resistant lacquers are obtained after about 8 to 12 hours. After several days, the films have hardened and become resistant to solvents. The lacquers have the properties shown in Table 5 and have substantially better resistance to discoloration at 220° C. than the comparison lacquer prepared from hexamethylene-1,6-diisocyanate or N,N′,N″-tris-(isocyanatohexyl)-biuret (see Table 6).

TABLE 5

| Lacquer film of polyisocyanate | Pendulum hardness according to König | Erichsen cupping | Color tone after 2 hours at 220° C. |
|---|---|---|---|
| A | 170 | 6.1 | White to pale yellow. |
| B | 185 | 5.8 | White with slight grey tinge. |
| C | 165 | 6.5 | Yellowish. |
| D | 168 | 6.3 | White to pale yellow. |
| E | 163 | 6.5 | White. |
| F | 160 | 6.8 | Yellowish white. |
| G | 169 | 6.1 | Do. |
| H | 175 | 5.9 | White to pale yellow. |
| L | 171 | 6.2 | White. |
| N | 162 | 6.8 | White to pale yellow. |
| O | 164 | 6.9 | Do. |
| P | 168 | 7.1 | Pale yellow. |
| Hexamethylene-1,6-diisocyanate. | 176 | 6.1 | Dark, dirty yellow with red tinge. |

EXAMPLE 2

75% polyisocyanate mixtures in ethyl acetate are added to the mixtures described in Example 1 as follows:

(a) 82 parts consisting of 87% of N,N′,N″-tris-(isocyanatohexyl)-biuret and 13% polyisocyanate A.
(b) 85 parts consisting of 80% of an addition product of 3 mols of hexamethylene diisocyanate with one mol of trimethylolpropane and 20% polyisocyanate B.
(c) 90 parts consisting of 80% of an addition of 3 mols of m-xylylenediisocyanate with one mol of trimethylolpropane and 18% of polyisocyanate E.
(d) 77 parts consisting of 86% of N,N′,N″-tris-(isocyanatohexyl)-biuret and 14% polyisocyanate H.
(e) 80 parts consisting of 86% of N,N′,N″-tris-(isocyanatohexyl)-biuret and 14% of polyisocyanate L.
(f) 81 parts consisting of 80% of N,N′,N″-tris-(isocyanatohexyl)biuret and 20% of polyisocyanate N.
(g) 93 parts by weight consisting of 80% of a copolymer which contains 60% of 1-methylbenzene-2,4-diisocyanate and 40% of 1,6-hexamethylene-diisocyanate as polyisocyanate and 20% of the same copolymer to which two dimethylsemicarbazide groups per molecule are attached.
(h) Comparative test: 75.5 parts by weight of N,N′,N″-tris-(isocyanatohexyl)-biuret.

After application of these lacquer mixtures to wood, metal or glass, dry, light-resistant lacquers which have the following properties are obtained after 8 to 12 hours:

TABLE 6

| Lacquer film of | Pendulum hardness according to König | Erichsen cupping | Color tone after 2 hours at 220° C. |
|---|---|---|---|
| (a) | 175 | 5.9 | Yellowish white. |
| (b) | 170 | 6.0 | Do. |
| (c) | 173 | 6.2 | White with grey tinge. |
| (d) | 172 | 6.2 | Pale yellow. |
| (e) | 169 | 6.3 | Yellowish white. |
| (f) | 171 | 6.0 | Pale yellow. |
| (g) | 182 | 5.8 | Yellowish white. |
| (h) Comparative test | 179 | 5.8 | Dark yellow with red tinge. |

EXAMPLE 3

100 parts by weight of polypropylene glycol of OH number 56 are reacted with the following polyisocyanate mixtures to form foams:

(a) 35 parts by weight of a mixture consisting of 65% of 1,6-hexamethylene-diisocyanate and 35% of polyisocyanate A.
(b) 40 parts by weight of the mixture consisting of 70% of 1,6-hexamethylenediisocyanate and 30% of polyisocyanate B.
(c) 40 parts by weight of a mixture consisting of 65% of isophorone-diisocyanate and 35% of polyisocyanate E.
(d) 45 parts by weight of a mixture consisting of 65% of 2,4,4′ - trimethyl-1,5-diisocyanatocyclohexane and 35% of polyisocyanate F.
(e) 39 parts by weight of a mixture consisting of 80% of m-xylylene-diisocyanate and 20% of polyisocyanate C.
(f) 34 parts by weight of 1,6-hexamethylene diisocyanate.

The above-mentioned components are in each case mixed with 1 part by weight of N,N′-endo-ethylpiperazine, 2 parts by weight of dimethylbenzylamine, 1 part by weight of polymethylsiloxane (90 cp.) and 2.5 parts by weight of water, and are vigorously stirred and foamed up. Foam formation soon sets in. The resulting elastic, light-resistant foams, which have a bulk density of about 30 kg./m.³, show the following improvements over the comparative sample F:

| Foam | Color tone of foam before heat treatment | Color tone after 2 hours at 220° C. |
|---|---|---|
| (a) | White | Very pale yellow. |
| (b) | White with yellow tinge. | Yellow. |
| (c) | White | White with yellow tinge. |
| (d) | White with yellow tinge. | Yellow. |
| (e) | White | White with yellow tinge. |
| (f) Comparative sample. | do | Dirty dark yellow with red tinge. |

Comparative test for Examples 4 and 5

A resin solution of the following composition is sprayed on steel sheet:

90 g. N,N′,N″-tris-(isocyanatohexyl)-biuret
100 g. of polyester containing 8% OH and prepared from phthalic acid anhydride and trimethylolpropane
95 g. titanium dioxide (rutile type)
345 g. solvent mixture of methyl ethyl ketone β-ethoxyethyl acetate 1:1

Discoloration of the white coating:

After 30 minutes at 220° C.—only slightly yellowed
After 60 minutes at 220° C.—yellowed
After 120 minutes at 220° C.—deep yellow to brown discoloration

EXAMPLE 4

A resin solution of the following composition was sprayed on steel sheet:

95 g. polyisocyanate H
100 g. polyester containing 8% OH and prepared from phthalic acid anhydride and trimethylolpropane
95 g. titanium dioxide (rutile type)
345 g. solvent mixture of methyl ethyl ketone β-ethoxy-ethyl acetate 1:1

Discoloration of the white coating:

After 30 minutes at 220° C.—none
After 60 minutes at 220° C.—trace of yellowing
After 120 minutes at 220° C.—slight yellowing

EXAMPLE 5

A resin solution of the following composition was sprayed on steel sheet:
100 g. polyisocyanate A
100 g. polyester resin containing 8% OH, prepared from phthalic acid anhydride and trimethylolpropane
100 g. titanium dioxide (rutile type)
370 g. solvent mixture of methyl ethyl ketone, toluene, β-ethoxy-ethyl acetate and butyl acetate 3:1:3:1

Discoloration of the white coating:

After 30 minutes at 220° C.—practically none
After 60 minutes at 220° C.—trace of yellowing
After 120 minutes at 220° C.—slight yellowing It is to be understood that any of the components and conditions mentioned as suitable herein can be substituted for its counterpart in the foregoing examples and that although the invention has been described in considerable detail in the foregoing, such detail is solely for the purpose of illustration.

What we claim is.
1.

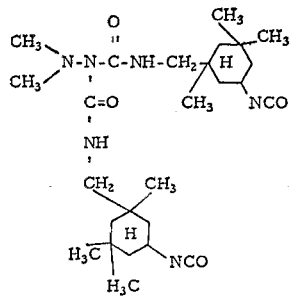

References Cited

UNITED STATES PATENTS 3,226,413  12/1965  Smith _____ 260—453
3,358,010  12/1967  Britain _____ 260—453
3,383,400  5/1968   Meisert et al. _____ 260—453

JOSEPH P. BRUST, Primary Examiner

D. H. TORRENCE, Assistant Examiner

U.S. Cl. X.R.

117—161; 252—182; 260—2.5 AT, 45.8 N, 45.85, 45.9 R, 75 NT, 77.5 AT, 247.2 A, 248 NS, 268 C, 308 R, 453 SP, 468 C, 471 C, 482 B, 482 C, 858